(12) United States Patent
Castle et al.

(10) Patent No.: US 9,319,093 B2
(45) Date of Patent: Apr. 19, 2016

(54) SYSTEM AND METHOD FOR COMMUNICATING WITH AN UNPOWERED DEVICE

(71) Applicant: Lexmark International, Inc., Lexington, KY (US)

(72) Inventors: Scott Richard Castle, Lexington, KY (US); John Thomas Fessler, Lexington, KY (US); Keith Bryan Hardin, Lexington, KY (US); Michael David Maul, Lexington, KY (US); Mark Stephen Underwood, Lexington, KY (US); Joseph Kamal Yackzan, Lexington, KY (US)

(73) Assignee: Lexmark International, Inc. KY (US)

(*) Notice: Subject to any disclaimer, the term of this patent is extended or adjusted under 35 U.S.C. 154(b) by 0 days.

(21) Appl. No.: 14/258,765

(22) Filed: Apr. 22, 2014

(65) Prior Publication Data

US 2015/0126138 A1 May 7, 2015

Related U.S. Application Data

(63) Continuation-in-part of application No. 14/072,484, filed on Nov. 5, 2013.

(60) Provisional application No. 61/791,482, filed on Mar. 15, 2013.

(51) Int. Cl.
*G06Q 10/08* (2012.01)
*H04B 1/44* (2006.01)
*G06F 9/445* (2006.01)

(52) U.S. Cl.
CPC ... *H04B 1/44* (2013.01); *G06F 8/65* (2013.01)

(58) Field of Classification Search
CPC .................................................. G06Q 10/0833
See application file for complete search history.

(56) References Cited

U.S. PATENT DOCUMENTS

| | | | | |
|---|---|---|---|---|
| 5,315,508 A | * | 5/1994 | Bain et al. | 705/28 |
| 2009/0303003 A1 | * | 12/2009 | Pritchard et al. | 340/10.1 |
| 2010/0182148 A1 | * | 7/2010 | Fan | 340/572.1 |
| 2012/0322380 A1 | * | 12/2012 | Nannarone et al. | 455/41.2 |
| 2015/0126137 A1 | * | 5/2015 | Castle et al. | H04B 1/40 |

* cited by examiner

*Primary Examiner* — David Bilodeau (57) ABSTRACT

An apparatus for shipping a device containing a circuit, including a bag sized for holding the device; and an antenna connected to the bag, the antenna having a first end for coupling to the circuit of the device when the device is in the bag so as to allow for radio frequency (RF) communication with the device while the device is in the bag. Separation of the device from the bag causes the antenna to be disconnected from the circuit of the device.

18 Claims, 8 Drawing Sheets

SYSTEM AND METHOD FOR COMMUNICATING WITH AN UNPOWERED DEVICE

CROSS REFERENCES TO RELATED APPLICATIONS

Pursuant to 37 C.F.R. §1.78, this application is a continuation-in-part application and claims the benefit of the earlier filing date of application Ser. No. 14/072,484, filed Nov. 5, 2013, entitled, "System and Method for Communicating with an Unpowered Device," which itself is related to and claims priority under 35 U.S.C. 119(e) from U.S. provisional application No. 61/791,482, filed Mar. 15, 2013, entitled, "System and Method for Communicating with an Unpowered Device." The content of each application is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates in general to appliances or electronic devices, and more particularly, to electronic devices which utilize radio frequency (RF) communication for communicating while consuming little to no power.

2. Description of the Related Art

As the complexity of electronic "gadgets" continues to rise, development cycles continue to shrink and more devices depend on embedded processors to provide a feature-rich experience. Many products have come to depend on complex embedded firmware to bring life to their functionality.

As a result of the complexity and short development cycles, many companies find themselves in the unenviable position of having to update product firmware (to fix bugs or add a complete function) after production of the product has begun. Depending on the timing and importance of the update, this sometimes means having to un-box products to re-program non-volatile memory within the product. This process can be expensive and time consuming, leading to both budget and schedule misses.

SUMMARY

Example embodiments provide a significant improvement over existing approaches by providing a method to install updated firmware and/or perform other tasks or operations without having to un-package and then power-up a unit when late changes become necessary. The method makes use of wireless communication and a self-contained power supply to support the tasks to be performed.

According to an example embodiment, there is disclosed a system for storing or shipping a device, including a protective bag and at least one antenna connected to the protective bag. The protective bag is sized to contain the device for subsequent placement of the bagged device in a box or other shipping container. The antenna has a first end portion for coupling to the device when the device is in the protective bag. In addition, the antenna is configured to receive radio frequency (RF) signals from a source external to the protective bag and transmit RF signals to the source when the antenna is connected to the device and the device is in the protective bag, so as to provide for RF communication between the source and the electronics device. The first end of the antenna is sized for slidable decoupling from the device so as to discontinue RF communication therewith. In the example embodiment, separation of the device from the bag causes the antenna to be disconnected from circuitry in the device.

Other example embodiments include the use of packaging material for locating the antenna within the box and inductive coupling for communicating with the device. Another example embodiment replaces RF communication with a direct electrical connection with the device while the device is in the box.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Example embodiments are generally directed to a circuit of a device which utilizes a received RF signal for connecting to a relatively small, internal power source to allow for the use of large memory capacities without the need of an external power supply or sizeable internal battery to supply power to the device. Example embodiments enable the device to communicate and perform predetermined operations despite being in an otherwise off mode, thus consuming zero or near zero energy. An RF signal is applied to a circuit of the unpowered device, generating a current to close a switching component and power the device sufficiently to perform one or more intended operations.

Reference will now be made in detail to the example embodiments, as illustrated in the accompanying drawings. Whenever possible, the same reference numerals will be used throughout the drawings to refer to the same or like parts.

Figure 1:
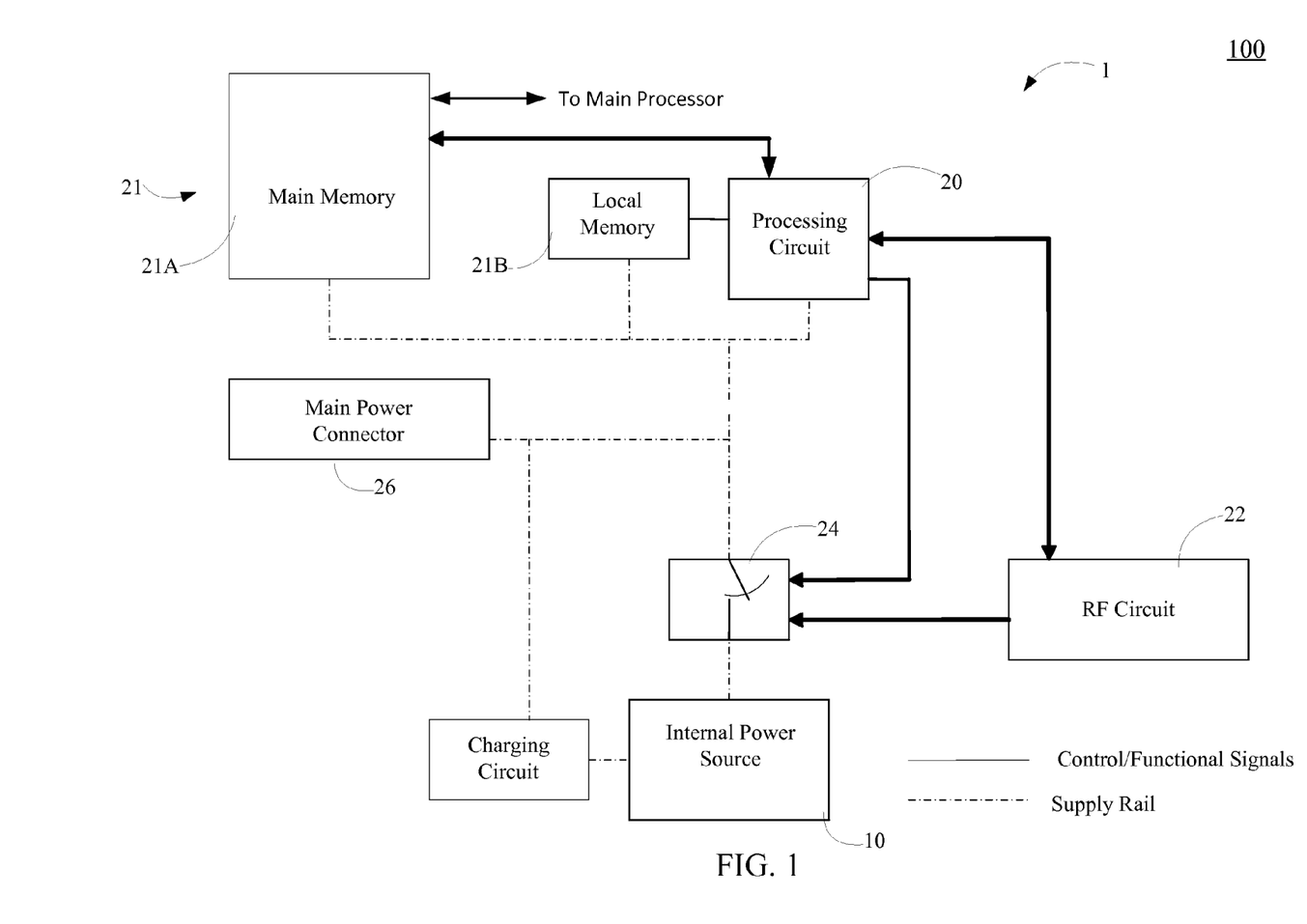
FIG. 1 is a block diagram of a portion of an electronics device according to one or more example embodiments.

Referring now to the drawings, and particularly to FIG. 1, an example embodiment includes circuit 1 of a device 100. Device 100 may be any type of device, such as an electronics device or appliance. Circuit 1 may include an internal power source 10, a processor 20 having memory 21 communicatively coupled thereto, an RF circuit 22, switching circuitry 24 coupled between the power source 10 and processor 20 and having a control terminal coupled to RF circuit 22 and processor 20. In general terms, an RF signal is received by RF circuit 22 and used to control switching circuitry 24 so as to provide power from power source 10 to processor 20, memory 21 and, as needed, RF circuit 22, in order to perform one or more operations before removing power to processor 20 via switching circuitry 24. It is understood that device 100 includes other circuitry and components to perform various functions during normal operation thereof when powered by a traditional power source. Circuit 1 may be located on the controller card of device 100, for example.

Processor 20 may be any circuitry that performs or controls the performance of the one or more operations during the time it is powered by power source 10. In an example embodiment, processor 20 may execute instructions maintained in memory 21 for performing the one or more operations. Though processor 20 may, in one embodiment, be a microprocessor or controller which performs operations or controls the operation of device 100 when device 100 is powered by a traditional power supply in a normal mode of operation, in another embodiment processor 20 is limited to performing mostly those one or more operations that are desired to be performed during the time processor 20 is powered by power source 10. In yet another alternative embodiment, processor 20 is implemented as a state machine or is otherwise hardwired.

Memory 21 may include nonvolatile system memory 21A for storing program code for operating device 100 and/or local memory 21B. It is understood that memory 21 may be implemented as any of a number of different types of memory.

With continued reference to FIG. 1, power source 10 supplies power to processor 20, memory 21 and optionally RF circuit 22 when initially connected thereto by RF circuit 22 via switching circuitry 24. In an example embodiment, power source 10 may be a battery of sufficient size to allow processor 20 to perform those operations that are desired to be performed during the time power source 10 sources power to processor 20. Battery size and capacity may vary by application and be based upon, among other things, the number and complexity of operations to be performed and the frequency with which such operations are expected to be repeated. It is understood that power source 10 may be other sources of power. In another example embodiment, power source 10 may be or include a capacitor which is charged by or through RF circuit 22 and have a capacitance size to allow for circuit 1 to perform the above-described one or more operations when coupled to power source 10.

RF circuit 22 includes RF receiver circuitry to receive an RF signal, and circuitry for using the received RF signal both to energize switching circuitry 24 for establishing an electrical connection between power source 10 and processor 20 and memory 21, and to communicate data with processor 20 or otherwise access memory 21. RF circuit 22 may include at least one antenna for receiving the RF signal over the air interface. In one example embodiment, a single antenna may be used to both energize switching circuitry 24 and communicate data with processor 20. This embodiment may, for example, provide for limited energizing or limited data communication, or both. In another example embodiment, at least two antennae are employed, including a first lower frequency antenna for use in energizing switching circuitry 24 and a second higher frequency antenna for communicating data with processor 20 at a relatively higher bandwidth. RF circuit 22 may include one or more filters and/or amplifier circuitry for suitably selecting and/or conditioning received RF signals for use in energizing switching circuitry 24 and communicating data with processor 20.

RF circuit 22 may receive RF signals following any one or more RF communication standards and/or protocols, including RFID and the IEEE 802.11 standards.

As discussed, when activated switching circuitry 24 provides an electrical connection between power source 10 and processor 20, memory 21 and optionally RF circuit 22 to allow power source 10 to supply power thereto. Switching circuitry 24 may have a source terminal coupled to power source 10, a drain terminal coupled to the power supply input of processor 20 and memory 21, and at least one control terminal. A control terminal may be coupled to RF circuit 22 for receiving the portion of the received RF signal for energizing switching circuitry 24 to charge the control terminal so as to close the connection between the source terminal and the drain terminal of switching circuitry 24. As can be seen, closing the connection between the source and drain terminals results in power source 10 being connected and supplying power to processor 20 and memory 21. The control terminal of switching circuitry 24 may also be coupled to an output of processor 20. In this way, processor 20 may maintain the charged state of the control terminal (to keep switching circuitry 24 closed) during the time operations are being performed, and discharge or de-energize the control terminal when the operations are complete, so as to open the connection between the source and drain terminals of switching circuitry 24, resulting in power source 10 being disconnected from processor 20 and power source 10 thereafter having no load. Switching circuitry 24 may be constructed with a relay circuit or field effect power transistor or the like.

Figure 3:
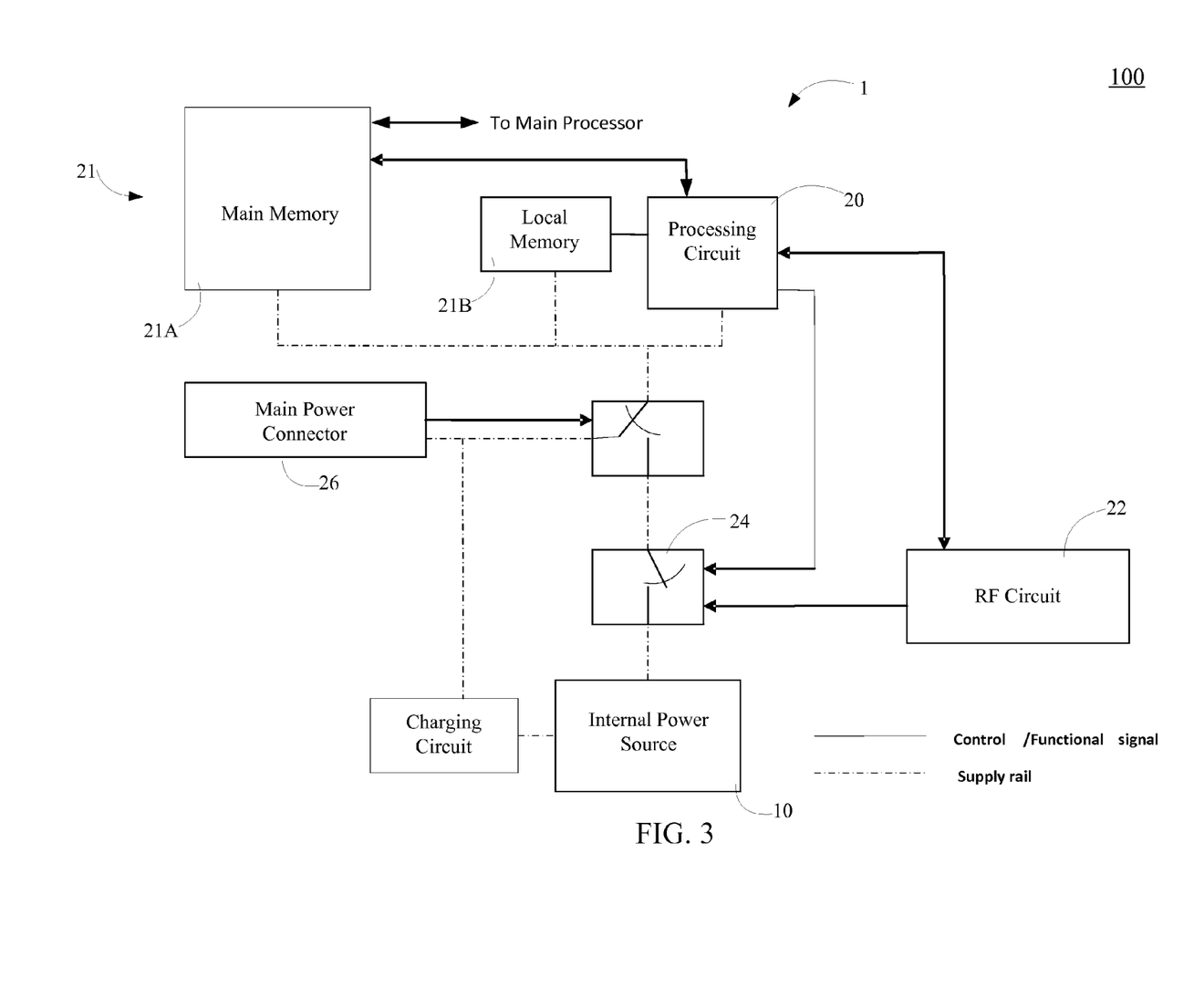
FIG. 3 is a block diagram of a portion of an electronics device according to another example embodiment.

Circuit 1 of device 100 may further include a main power connector 26 coupled to the supply terminal of processor 20. This allows for processor 20 to perform operations during a normal mode of operation of device 100. Such coupling may be direct or via second switching circuitry (shown in FIG. 3). Further, circuit 1 may include a charging circuit for charging power source 10 (when implemented as a battery) when a power supply is connected to main power connector 26.

In another example embodiment, device 100 may include a main processor (not shown) that draws more power than power source 10 may be able to provide such that processor 20 is used mostly or entirely to perform operations in association with RF signals received by RF circuit 22 while device 100, including the main processor, is otherwise unpowered. In this embodiment, memory 21 may be a two port memory having a first port for communicating its contents with processor 20 during the time when device 100 is mostly unpowered and a second port for communicating its contents with the main processor during normal operation of device 100. Alternatively, memory 21 may be a switched memory for communicating its contents with both processor 20 and the main processor.

The operation of circuit 1 of device 100 will be described. Initially, device 100, and particularly circuit 1, is unpowered, consuming no power. Upon reception of one or more RF signals, RF circuit 22 provides signal energy from the RF signal to charge or close switching circuitry 24, which connects power source 10 to processor 20 and memory 21 so as to power the same. Once powered, processor 20 may drive switching circuitry 24 to maintain switching circuitry 24 in the closed position. When powered, processor 20 is also capable of performing a number of functions.

The one or more RF signals may include authentication signal data which processor 20 may use to authenticate the source of the one or more RF signals. Authentication will serve to prevent a hacker from accessing device 100. Following authentication, processor 20 may perform any one or more operations.

For example, processor 20 may download firmware received by RF circuit 22 over the air interface, and program the firmware into memory 21A so as to replace firmware previously stored therein. In this way, firmware for device 100 may be updated without having to power up device 100 using a traditional power source through main power connector 26. It is understood that processor 20 may also download data for storage in memory 21, such as country or region specific data in which device 100 is intended to be sold.

In addition or in the alternative, RF circuit 22 includes an RF transmitter and processor 20 may upload data for transmission by RF circuit 22. In this embodiment, RF communication may be powered by power source 10 for both receiving and transmitting RF signals over the air interface. Such uploaded data may include, for example, information relating to the particular location of device 100. In this embodiment, device 100 is capable of being located despite being unpowered except for power source 10.

It is understood that processor 20 may perform any of a number of operations as specified in the one or more RF signals received by RF circuit 22 or as specified in memory 21 during the time processor 20 is powered by power source 10. It is further understood that the operations performed during the time power source 10 supplies power to processor 20 may be different from the operations performed by device 100 during the normal mode of operation in which device 100 is powered by an external power source via main power connector 26.

As discussed, the example embodiments allow for communication with device 100 when device 100 is otherwise unpowered and consuming no power. In an example embodiment, device 100 may be boxed for shipment and subsequent sale, such as in a cardboard box. Further, device 100 may be contained in a protective bag within the cardboard box. In this embodiment, the antenna or antennae of RF circuit 22 may be located largely external to device 100.

Figure 2:
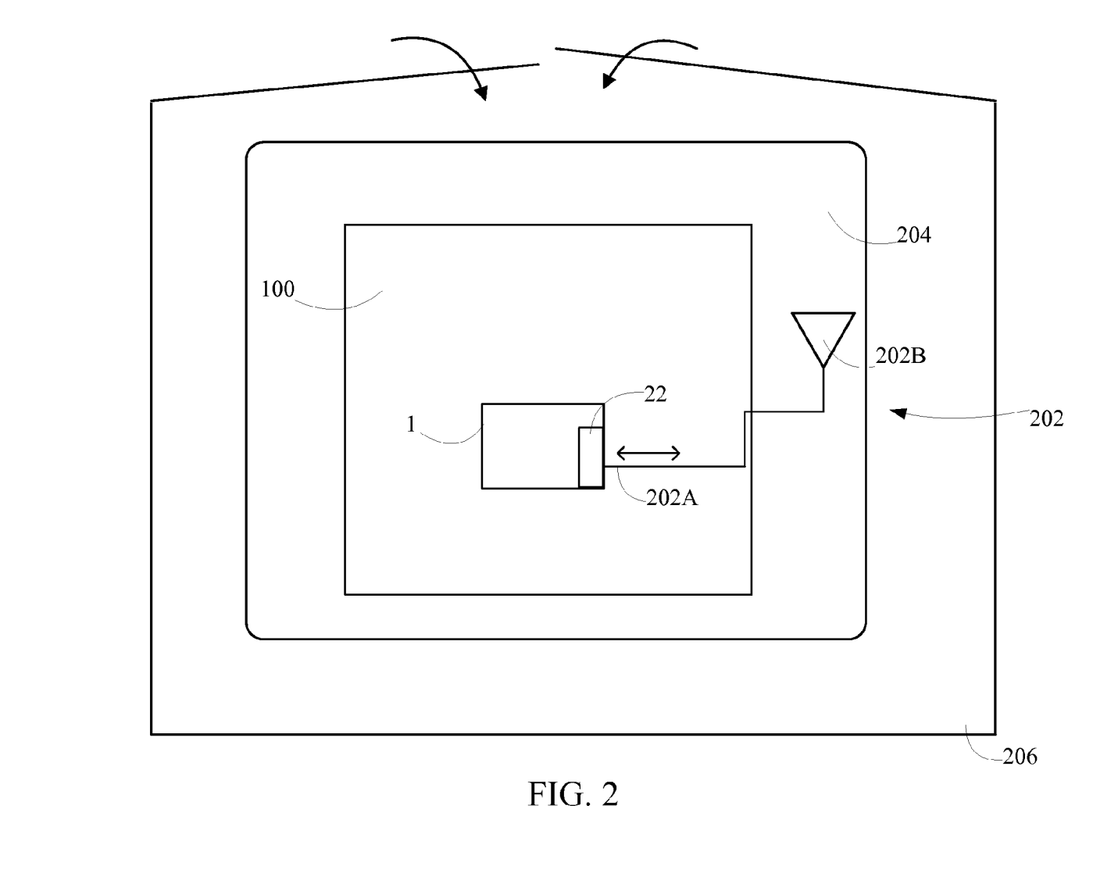
FIG. 2 is a block diagram of a portion of a system including the electronics device of FIG. 1, according to an example embodiment.

With reference to FIG. 2, antenna assembly 202 of RF circuit 22 may be located on, embedded in or integrated with a protective bag 204 so as to allow for RF communication with device 100 despite being placed in bag 204 and contained in box 206. Antenna assembly 202 may include a wire end 202A that may be inserted into device 100 and provide a temporary electrical connection with the rest of RF circuit 22 of circuit 1. The temporary electrical connection may be a pressure fit type of connection, similar to the type seen in some devices that are purchased with a battery and a removable piece of material is disposed between the battery and a battery terminal so as to prevent battery discharge until slidingly removed following purchase of the device. In this case, wire end 202A of antenna assembly 202 may be a smooth piece of electrically conductive material that physically contacts the circuitry of RF circuit 22 so that device 100, despite being unpowered, may be placed in protective bag 204 and boxed for shipment or sale yet remain capable of receiving RF signals. Device 100 may include a slot through which wire end 202A of antenna assembly 202 is inserted in order to temporarily electrically connect with the remaining part of RF circuit 22.

As mentioned, antenna assembly 202 may be located on, embedded within or integrated with protective bag 204. Specifically, the antenna portion 202B of antenna assembly 202, which receives RF signals, may be disposed along an outer portion of protective bag 204 and secured thereto using tape, an adhesive or the like. Wire end 202A extends inwardly from an inner surface of bag 204 so as to connect with the remainder of RF circuit 22 appearing in device 100. In this way, circuit 1 of device 100 may be capable of receiving RF signals via antenna assembly 202 and RF circuit 22 despite being contained within bag 204. The amount by which wire end 202A extends from an inner surface of bag 204 depends upon the dimensions of device 100, the location of the slot which receives wire end 202A on device 100, and the location of the antenna portion 202B of antenna assembly 202.

During the time device 100 is boxed and thus unpowered, device 100 may nevertheless communicate using circuit 1. For example, firmware stored in memory 21 or other memory within circuit 1 or elsewhere in device 100 may be updated using circuit 1. Further, data may be downloaded into or uploaded from device 100 when bagged and boxed. Then, following purchase of device 100, the box 206 is opened and device 100 is removed from its protective bag 204. Removing device 100 from the protective bag 204 causes the wire end 202A of the antenna assembly 202 to slide out of its physical engagement with, and is thereby electrically disconnected from, the remainder of RF circuit 22. Thereafter, without an antenna for receiving RF signals, circuit 1 can no longer be used. This, along with possible additional authentication mechanisms and/or disabling settings made once device 100 is powered up through main power connector 26, provides a measure of security to prevent subsequent hacking of device 100.

Figure 4:
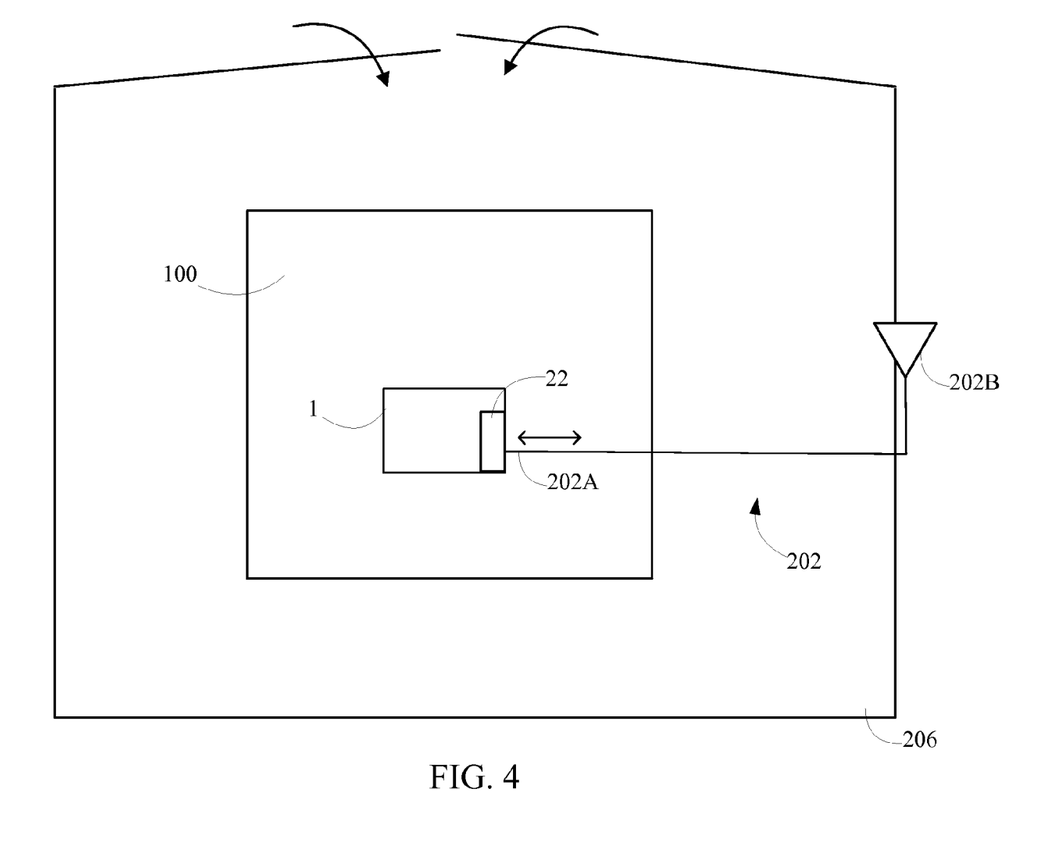
FIG. 4 is a block diagram of a portion of a system including the electronics of FIG. 1, according to another example embodiment.

In the event protective bag 204 is not used such that device 100 is placed directly within box 206, antenna assembly 202 may be disposed along and/or embedded within box 206. As shown in FIG. 4, antenna portion 202B may be disposed along an outer surface of box 206 and secured thereto using tape, an adhesive or the like. In the event box 206 is a cardboard box, antenna portion 202B may be disposed between adjacent inner and outer wall portions which form a wall or panel of box 206. Wire end 202A may extend from the inner surface of box 206, slide within a slot appearing on device 100, and at least temporarily connect to the remainder of RF circuit 22.

Figure 5:
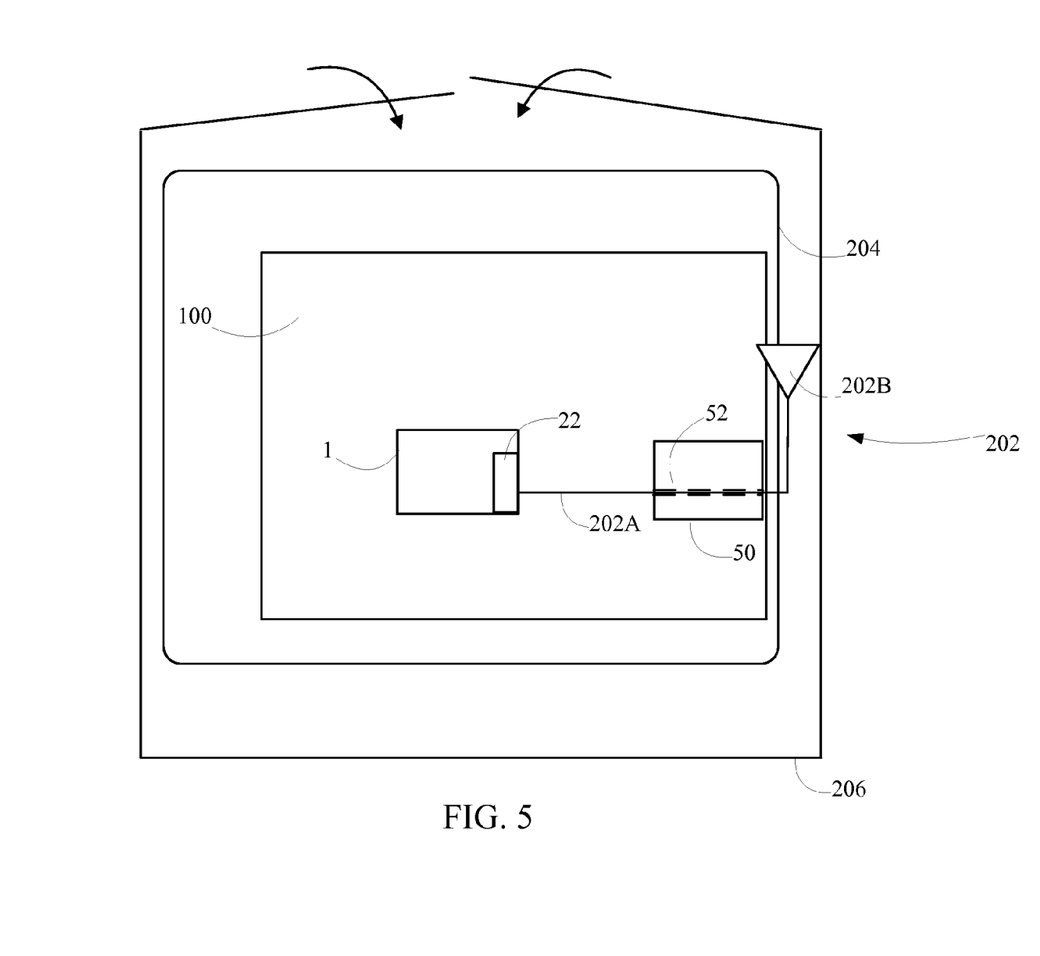
FIGS. 5 and 6 are block diagrams of systems according to additional example embodiments.
Figure 6:
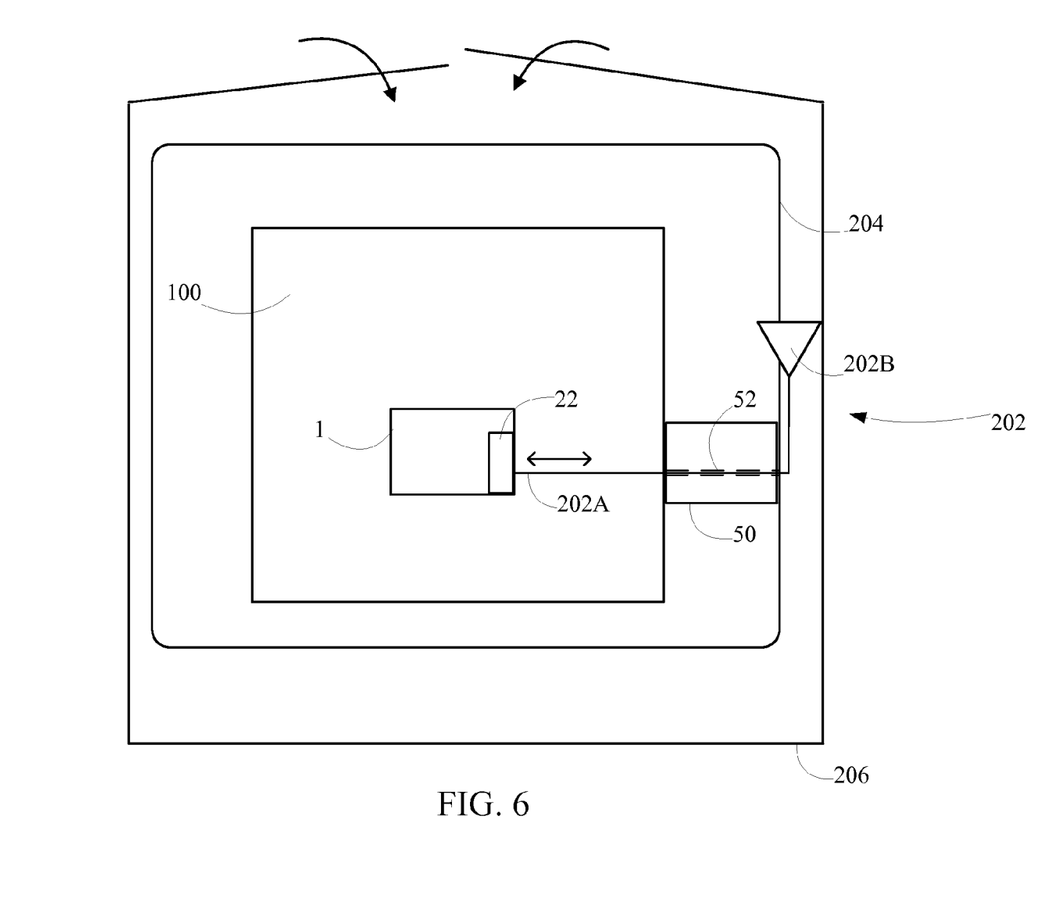

An example embodiment includes a positioning mechanism for positioning antenna assembly 202 of RF circuit 22 in a predetermined location within box 206. The positioning mechanism maintains antenna assembly 202 in a predetermined and substantially fixed position relative to device 100 and box 206. This positioning ensures that antenna assembly 202 remains electrically connected to circuit 1 of device 100 during the time device 100 is in box 206 and has the desired positioning and orientation within box 206 for effective RF communication (transmission and/or reception) between circuit 1 and an external RF source through box 206. In one embodiment, the positioning mechanism may include at least one piece of packaging or shipping material 50. Packaging material 50 may be disposed within device 100 (FIG. 5), within protective bag 204 adjacent device 100 (FIG. 6), or outside protective bag 204. Packaging material 50 may also be sized and shaped to accommodate the size and shape of device 100 and box 206. In an embodiment, packaging material 50 may be made of a resiliently compressible material, such as foam, for facilitating stable securement between components within device 100 or between device 100 and an inner surface of box 206 when device 100 is inserted and packaged therein. Packaging material 50 may include a slot 52 that is sized for receiving a portion of antenna assembly 202 therein. In this way, slot 52 helps to ensure that antenna assembly 202 does not move relative to device 100 and box 206 during shipment. Alternatively, a portion of antenna assembly may be positioned against an outer surface of packaging material 50 in box 206. Packaging material 50 may be secured to an inner surface of the housing of device 100, for the embodiment of FIG. 5, or to an inner or outer surface of protective bag 204, for the embodiment of FIG. 6, using an adhesive or the like.

Figure 7:
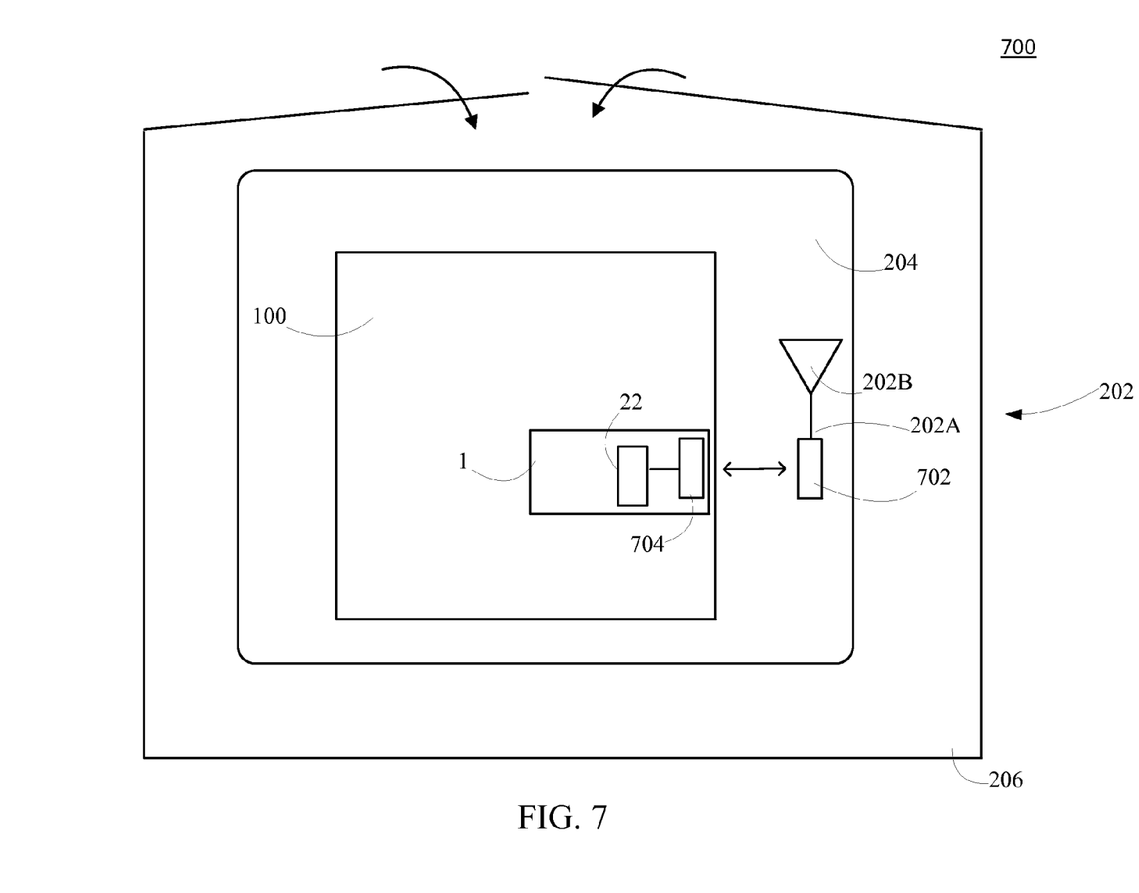
FIG. 7 is a block diagram of a system utilizing inductive coupling, according to another example embodiment.

FIG. 7 illustrates a system 700 according to another example embodiment, having electronics device 100, antenna assembly 202, (optionally) protective bag 204 and box 206 as described above. In addition, instead of there being a direct electrical connection from physical contact between antenna assembly 202 and circuit 1, antenna assembly 202 is connected to circuit 1 via inductive coupling. Specifically, wire end 202A of antenna assembly 202 includes an inductive loop 702 which is disposed adjacent device 100. Circuit 1 and/or RF circuit 22 of device 100 also includes an inductive loop 704 which is disposed within device 100 and is inductively coupled to inductive loop 704. In this way, RF signals received by antenna assembly 202 are communicated to RF circuit 22 without a portion of antenna assembly 202 being inserted within device 100 when device 100 is packaged within box 206.

Figure 8:
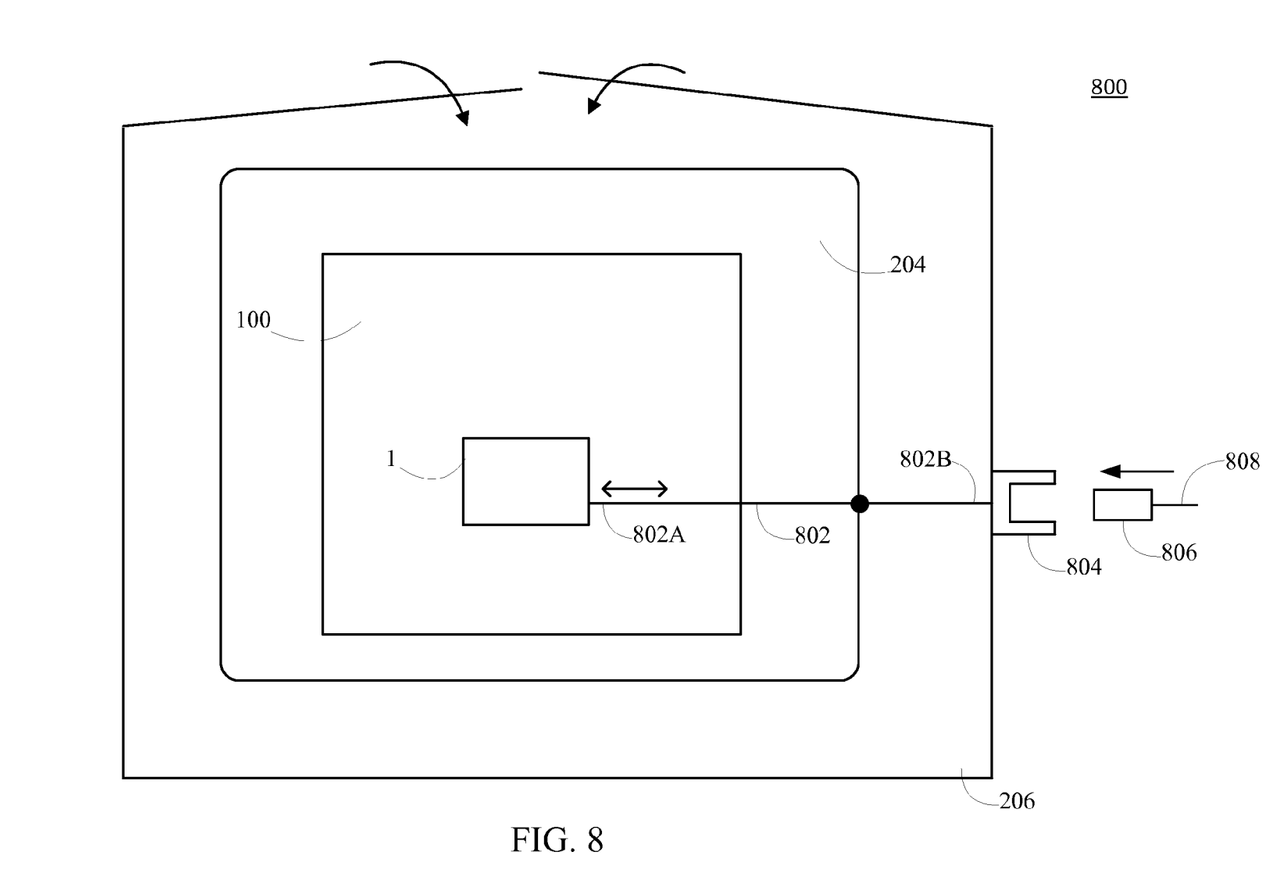
FIG. 8 is a block diagram of a system utilizing a direct electrical connection with an electronics device, according to yet another example embodiment.

The systems described above utilize RF communication for communicating with device 100 during the time when device 100 is, with the exception of circuit 1 thereof, unpowered. It is understood that other forms of communication may be employed instead of RF communication to, for example, upload and/or download data to circuit 1. FIG. 8 illustrates system 800 according to another example embodiment. In system 800, a wire assembly 802 runs through protective bag 204 and has an end portion 802A which forms one or more electrical connections with circuit 1 of device 100 when slidingly inserted therein. Wire assembly 802 may be connected to protective bag 204 so that end 802A of wire assembly 802 is easily disconnected and removed from device 100 when device 100 is separated from protective bag 204. A second end portion 802B of wire assembly 802 is disposed along or through box 206 and electrically connects with connector 804 of box 206. Connector 804 may be formed along the outer surface of box 206. Connector 804 is sized and dimensioned for connecting with a connector 806 external to box 206. Connector 806 is an electrical connector having a wire assembly 808 extending therefrom such that when connector 806 engages with connector 804, an electrical connection is made between wire assembly 808 and circuit 1 of device 100. Each of wire assemblies 802 and 808 may include one or more wire segments.

The use of a wired connection to circuit 1 allows for changes to circuit 1. For example, RF circuit 22 may be no longer needed. Circuit 1 may include circuitry such as electrostatic discharge (ESD) circuitry to prevent circuit 1 and other components of device 100 from receiving a damaging static discharge current, and other circuitry for electrically isolating circuit 1 from harmful events and limiting voltage and current levels within circuit 1. Further, circuit 1 may include interface circuitry, including authentication circuitry, for providing a secure electrical interface with the components of circuit 1 which prevents unauthorized access to device 100. Wire assembly 802 may include a plurality of wires for, among other things, communicating with processing circuit 20 and controlling the open/close state of switching circuitry 24 which thereby controls the powering of processing circuit 20.

Components of circuit 1 may be included on the controller card of any product or device 100 that could potentially require late changes to embedded system firmware that is resident in on-board non-volatile memory. To prolong battery life, when circuit 1 is not in use, internal power source 10 is disconnected from processor 20 by way of switching circuitry 24, as discussed above. When switching circuitry 24 is closed, internal power source 10 is connected to processor 20, which is then capable of booting the re-programmed device.

As discussed, the radiated communication link, RF circuit 22, may serve a dual purpose in the example embodiments. A first purpose is energy transfer and the second purpose is communication. The energy transferred from the radiating RF source to circuit 1 is low, but is sufficient to support limited functionality. In an example embodiment, the energy is used to operate or control switching circuitry 24. When the RF circuit 22 is excited by an external field, it can direct the energy derived from the radiated signal to "flip" or close the switch of switching circuitry 24, thereby connecting internal power source 10 to processor 20 and the rest of circuit 1. Once this is accomplished, the RF link can then be used solely for communication.

As power source 10 provides power to circuit 1, processor 20 will begin executing code (stored in local non-volatile memory 21) that will allow device 100 to perform its intended operations. As discussed, the intended operations may include downloading firmware received by RF circuit 22 into memory 21, and/or uploading firmware from memory 21 to a destination via transmission by RF circuit 22.

The foregoing description of several methods and an embodiment of the invention have been presented for purposes of illustration. It is not intended to be exhaustive or to limit the invention to the precise steps and/or forms disclosed, and obviously many modifications and variations are possible in light of the above teaching. For example, circuit 1 may utilize a battery assisted passive RFID tag as part of RF circuit 22.

It is intended that the scope of the invention be defined by the claims appended hereto.

What is claimed is:

1. A system, comprising:
   at least one of a protective bag and a box;
   an electronics device disposed in the at least one protective bag and box; and
   at least one antenna connected to the at least one protective bag and box, the at least one antenna having a first end portion coupled to the electronics device for communicating therewith, the at least one antenna configured to receive radio frequency (RF) signals from a source external to the at least one protective bag and box, and transmit RF signals from the electronics device to the source.

2. The system of claim 1, wherein the first end portion of the at least one antenna is inserted within the electronics device.

3. The system of claim 2, wherein the first end portion of the at least one antenna is dimensioned for sliding removal from the electronics device.

4. The system of claim 3, wherein the first end portion of the at least one antenna is slidingly removed from the electronics device when the electronics device is separated from the at least one protective bag and box.

5. The system of claim 1, wherein the first end portion of the at least one antenna is connected to circuitry of the electronics device when the electronics device is disposed within the at least one protective bag and box.

6. The system of claim 5, wherein the first end portion of the at least one antenna is sized for connection to the circuitry of the electronics device by a pressure fit connection therewith.

7. The system of claim 5, wherein the at least one antenna is removed from the electronics device and disconnected from the circuitry thereof upon the electronics device being removed from the at least one protective bag and box.

8. The system of claim 1, wherein the at least one protective bag and box comprises a protective bag and a box within which the protective bag, at least a portion of the at least one antenna and the electronics device are disposed.

9. The system of claim 1, wherein when the at least one antenna comprises a plurality of antennae.

10. The system of claim 1, wherein the at least one antenna is embedded in the at least one protective bag and box.

11. An apparatus for use in shipping a device, comprising:
a bag or box sized for holding a device containing a circuit; and
at least one wire connected to the bag or box, the at least one wire having a first end for coupling to the circuit of the device when the device is in the bag or box and a second end disposed along or extending from the bag or box, the at least one wire facilitating communication with the device when the device is in the bag or box.

12. The apparatus of claim 11, further comprising an antenna assembly, wherein the at least one wire forms part of the antenna assembly.

13. The apparatus of claim 11, wherein the first end of the at least one wire is sized for slidable decoupling from the device.

14. The apparatus of claim 11, wherein the bag or box comprises a box, the at least one wire and the device are disposed therein such that when the device is disposed in the box, the at least one wire allows for communication between the circuit of the device and a source external to the box.

15. The apparatus of claim 14, wherein separation of the device from the box causes the at least one wire to be decoupled from the circuit of the device.

16. The apparatus of claim 14, further comprising at least one packaging member, wherein when the device is disposed in the box, the at least one packaging member is arranged relative to the at least one wire in the box so that the at least one wire is disposed in a predetermined location in the box.

17. The apparatus of claim 14, further comprising a connector member disposed along an outer surface of the box and electrically connected to a second end of the at least one wire, the connector member being dimensioned for connecting with another connector external to the box.

18. The apparatus of claim 11, wherein each wire includes an inductive member disposed at the first end thereof for inductively coupling with an inductive member in the circuit of the device.

* * * * *